United States Patent
Lam

(10) Patent No.: US 8,416,583 B2
(45) Date of Patent: Apr. 9, 2013

(54) ENERGY OUTPUT CIRCUIT AND ITS CONTROL METHOD

(76) Inventor: John Lam, Kwai Chung (CN)

(*) Notice: Subject to any disclaimer, the term of this patent is extended or adjusted under 35 U.S.C. 154(b) by 0 days.

(21) Appl. No.: 12/809,668

(22) PCT Filed: Nov. 14, 2008

(86) PCT No.: PCT/CN2008/073056
§ 371 (c)(1),
(2), (4) Date: Jun. 21, 2010

(87) PCT Pub. No.: WO2009/097723
PCT Pub. Date: Aug. 13, 2009

(65) Prior Publication Data
US 2010/0270993 A1 Oct. 28, 2010

(30) Foreign Application Priority Data
Jan. 30, 2008 (CN) .......................... 2008 1 006008

(51) Int. Cl.
*H02M 3/335* (2006.01)
(52) U.S. Cl. .................. 363/21.01; 363/56.11
(58) Field of Classification Search ............... 363/21.01, 363/56.11, 131, 140
See application file for complete search history.

(56) References Cited

U.S. PATENT DOCUMENTS

| 6,141,232 A | 10/2000 | Weinmeier et al. |
| 6,288,918 B1* | 9/2001 | Tarodo et al. ................... 363/44 |
| 7,570,497 B2* | 8/2009 | Jacques et al. ............. 363/21.03 |

FOREIGN PATENT DOCUMENTS

| CN | 2438266 Y | 7/2001 |
| CN | 1601878 A | 3/2005 |
| CN | 201160261 Y | 12/2008 |
| JP | 7107740 A | 4/1995 |

* cited by examiner

*Primary Examiner* — Shawn Riley
(74) *Attorney, Agent, or Firm* — Alan Kamrath; Kamrath IP Lawfirm, P.A.

(57) ABSTRACT

An energy output circuit and its control method includes a switch device (2), a transformer (4) and a controller (1). The switch device (2) is connected between a primary of the transformer (4) and an input power source in series. The controller (1) calculates an energy output waveform and sends a command according to a request or a level to control the switch device (2), to control the on/off time of the primary of the transformer (4). The transformer (4) is an ordinary low-frequency transformer.

7 Claims, 13 Drawing Sheets

ENERGY OUTPUT CIRCUIT AND ITS CONTROL METHOD

BACKGROUND OF THE INVENTION

1. Field of the Invention

The present invention relates to an energy output control method for and a circuit of a welding machine, heating apparatus, and a direct current motor, and, more particularly, to a pulse width modulating method for and a circuit of the energy output.

2. Description of the Related Art

A PWM (Pulse Width Modulation) circuit is widely used for controlling the output energy of a welding machine, a switch of a heating apparatus, and a direct current motor used in industry. The conventional PWM uses a high-frequency transformer to accomplish the PWM output energy. When using the high-frequency transformer, an energy output circuit sometimes can not reach a high energy output and constrains the output energy. Using the high-frequency transformer to process the PWM, when a cycle of a pulse is fixed and the frequency keeps in constant, a duty cycle can be modulated by modulating a pulse width to control the output energy. While modulating a bigger range in this case, it would result in a duty is too huge so that the energy output is not stable.

SUMMARY OF THE INVENTION

According to the present invention, the main purpose is to provide an energy output control method and its circuit to solve the technology problem of making a controllable and stable high-power energy by the circuit.

The present invention uses the following techniques: an energy output control method comprises the steps of: 1.installing a controller used to control a switch device of an energy output circuit; 2.implementing the controller to calculate a required output energy waveform according to an output energy requested by an electric device or a pre-set output energy level decided by the operator; 3.implementing the controller to design an expected energy output waveform in accordance with the energy waveform; and 4.implementing the controller to send a command in accordance with the expect energy output waveform to control the switch device, to control the on/off time of the primary of the ordinary low-frequency generator via the switch device.

The controller measures an output characteristic curve generated by an ordinary transformer and saves the output characteristic curve into a storage connected thereto.

The transformer is an ordinary low-frequency transformer.

The controller receives a feedback signal generated from an output of the transformer and modulates the expect energy output curve.

A pulse width of an on/off time pulse of the transformer increases, decreases or remains unchanged with time.

A turn-off time of a secondary of the transformer is larger than a minimum demagnetized time of the transformer.

The controller calculates the pulse width, the turn-off time and a switch control timing according to the following method: 1.defining an End Time "te", which is the finish time of the pulse, is a Present Time "tw" of the pulse, and is also a Start Time "to" of a pulse that is previous to the aforementioned pulse, wherein the time serial number "n" is 0; 2.calculating a Turn-On Time "tn" according to a voltage "v" of a Present Time "tw"; while the voltage "v"=maximum voltage "Vmax", the Start Time "to" of the pulse=the start time of the horizontal section of the curve, the Turn-On Time "tn"=the Present Time "tw"–the Start Time "to" of the pulse; while voltage "v"<maximum voltage "Vmax", the Turn-On Time "tn"=a Minimum Turn-On Time "t", the Start Time "to" of the pulse=the Present Time "tw"–the Minimum Turn-On Time "t"–the minimum Demagnetized Time "Tc"; 3.the time serial number "n" plus 1 while the Present Time "tw"=the Start Time "to" of the pulse that is previous to the aforementioned pulse; and 4.repeating the calculation of steps 2 and 3 until the Present Time "tw" =0, that is, the start time of the energy curve.

An energy output control circuit comprises a transformer, which is an ordinary low-frequency transformer. A switch device is connected between the primary of the transformer and an input power in series, and the switch device receives a control signal of a controller. A demagnetized circuit connects with both sides of the primary of the transformer in parallel.

The secondary of the transformer connects with a filter circuit.

A voltage feedback circuit is connected between the filter circuit and the controller.

Comparing with the present invention and the prior art, the present invention uses the ordinary low-frequency transformer, calculates the energy output curve, sends a command to the switch device, and controls the on/off time of the switch device to control the output waveform and output voltage of the ordinary low-frequency transformer. Thus, the present invention has a larger output energy range and a stable output energy.

BRIEF DESCRIPTION OF THE DRAWINGS

The present invention will be described through detailed illustration of the preferred embodiments referring to the drawings.

FIG. 7-1 is an output characteristic curve diagram of the transformer measured by a method of the present invention.

FIG. 7-2 is an output energy oscillogram requested by the method of the present invention.

FIG. 7-3 is an output pulse oscillogram expected by the method of the present invention.

FIG. 7-4 is a pulse oscillogram of a switch controlling time of the method of the present invention.

FIG. 7-5 is an output energy oscillogram of the embodiment of the present invention.

DETAILED DESCRIPTION OF THE PREFERRED EMBODIMENTS

Figure 2:
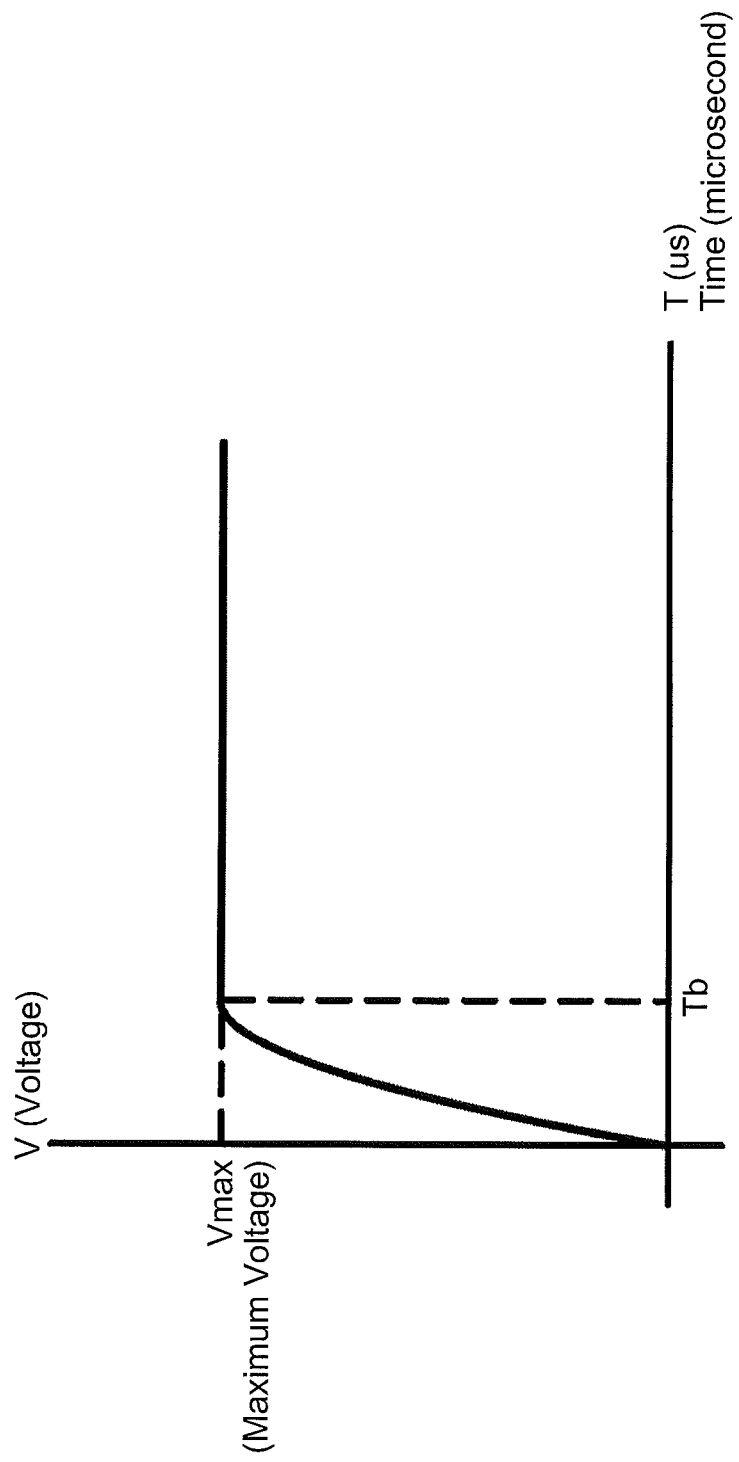
FIG. 2 is an output characteristic curve of the transformer (1).
Figure 3:
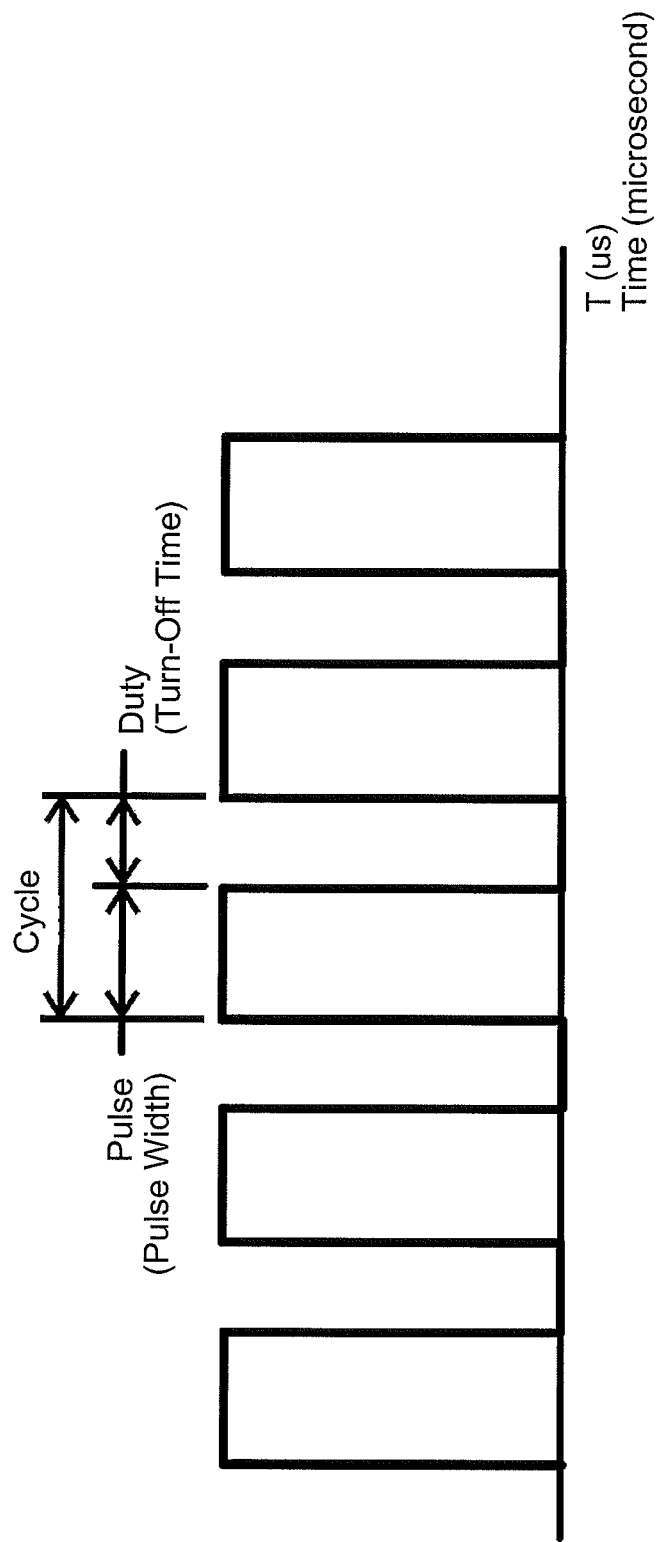
FIG. 3 is a pulse oscillogram of a conventional pulse width modulation (PWM).

Referring to FIG. 3, there is shown a conventional pulse width modulation. When a cycle of a pulse is fixed and a frequency is kept in constant, the duty cycle of the pulse is: pulse width/turn-off time. The duty cycle can be modulated by modulating a pulse width to control the output energy. While modulating a large range in this case, it would result in the off-time being too huge, so that the energy output is not stable. Referring to FIG. 2, an energy output circuit in accordance with the present invention uses a basic characteristic of an ordinary transformer. That is, while an initial input voltage of the transformer is kept at a fixed value, a output voltage "V" generated from the secondary of the transformer would be changed in accordance with a turn-on time "T" of a switch device. The output voltage "V" gradually raises from the initial state of 0 to the saturation state having a steady output condition. The time range is between 0 and few milliseconds. Particularly, the time range is less than 10 ms to avoid the transformer from magnetizing. A saturation time "Tb" is defined as the time required to reach the saturation state for the output voltage "V". The saturation time "Tb" of the transformer in accordance with the embodiment of the present invention lies in 0~1 ms, and the response frequency is below 1 KHz. In order to facilitate the description, a curve of the transformer output varied in accordance with time is defined as an 'output characteristic curve' ("VT curve"for short).

Figure 1:
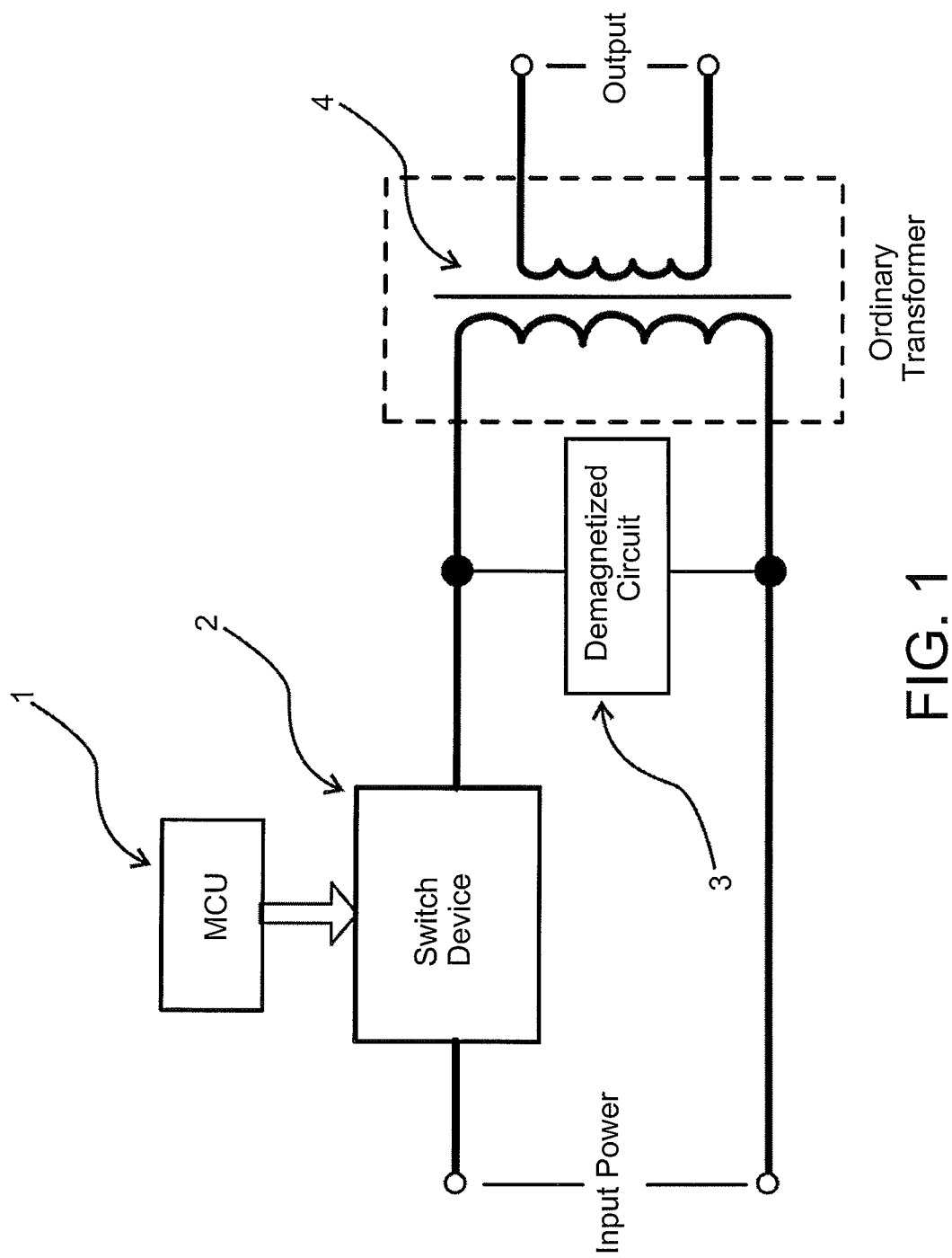
FIG. 1 is a circuit diagram of an ordinary transformer modulation (1).

Referring to FIG. 1, an ordinary low-frequency transformer 4 is used in accordance with the present invention. The secondary of the transformer is an energy output, and a switch device 2 is connected between the primary of the transformer and an input power in series. The switch device 2 receives a control signal of a controller MCU 1. A demagnetized circuit 3 connects with both sides of the primary of the transformer 4 in parallel. The demagnetized circuit 3 is adapted to eliminate a flyback voltage generated from the ordinary low-frequency transformer while turning off the switch device 2. The demagnetized circuit 3 prevents the flyback voltage from influencing the output curve, and protects the switch device 2. In the present invention, the application field of the transformer is extended over the response frequency of the transformer, and corresponds to the "VT curve" of the transformer. The turn-off time of the ordinary low-frequency transformer 4 is controlled via the on/ off state of the switch device 2 controlled by the controller MCU 1. Therefore, an output waveform of the ordinary low-frequency transformer 4 can be controlled.

The saturation time "Tb" of the ordinary low-frequency transformer in accordance with the present invention lies in 0~3 ms. It is more suitable for a microcontroller to control the turn-off time of the transformer via the switch device, and consequently to realize the purpose of modulating the output voltage "V". It can also use a high-frequency transformer. However, the saturation time "Tb" of the high-frequency transformer has a small range, so that it is more difficult than the ordinary low-frequency transformer to be controlled by the microcontroller.

Figure 4:
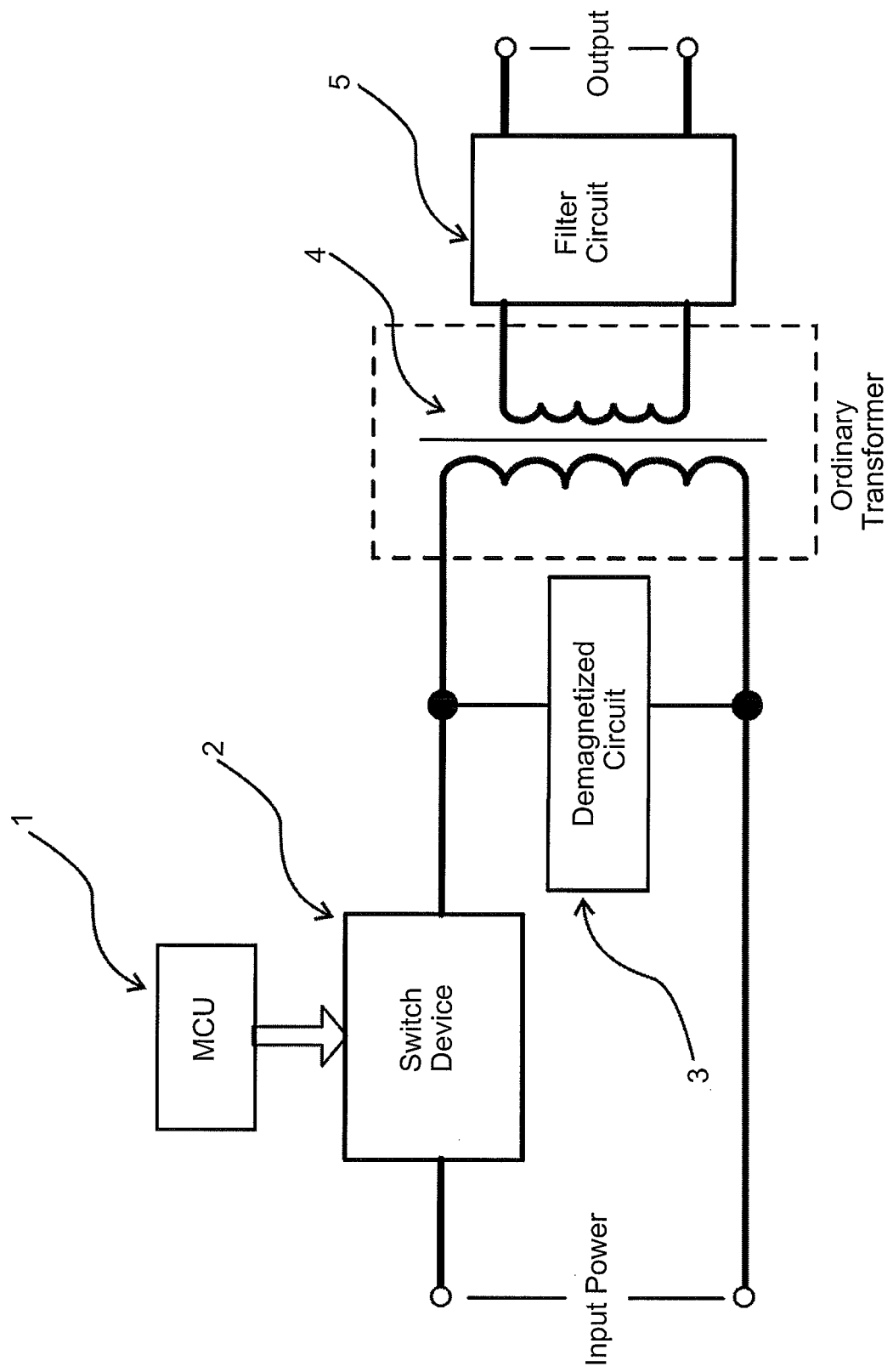
FIG. 4 is a circuit diagram of an ordinary transformer modulation (TOM) according to an embodiment of the present invention (2).

Referring to FIG. 4, in order to obtain the requested energy output waveform, the secondary of the transformer 4 connects with a filter circuit 5, so that different duty cycles can be transformed to different voltages.

Figure 5:
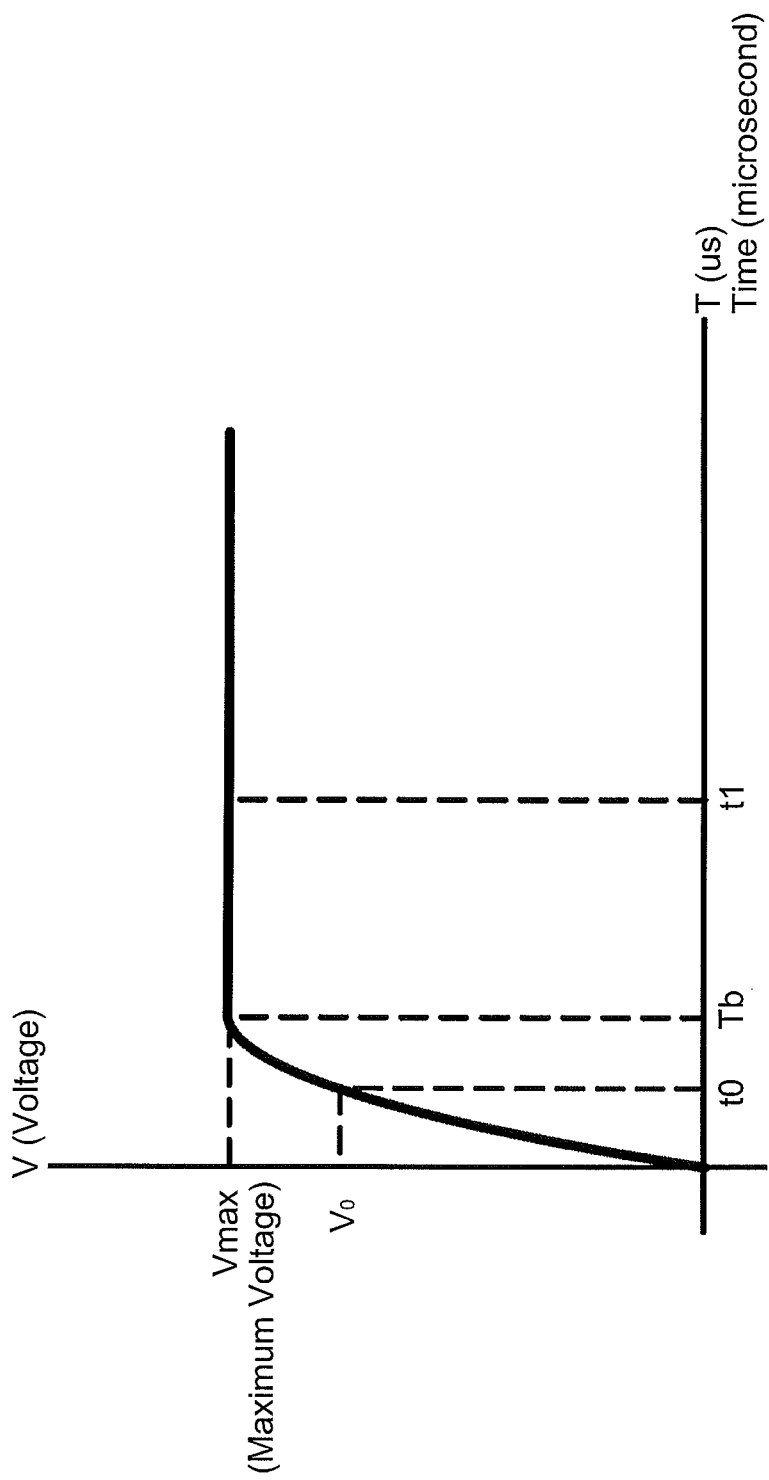
FIG. 5 is an output characteristic curve of the transformer (2).
Figure 6:
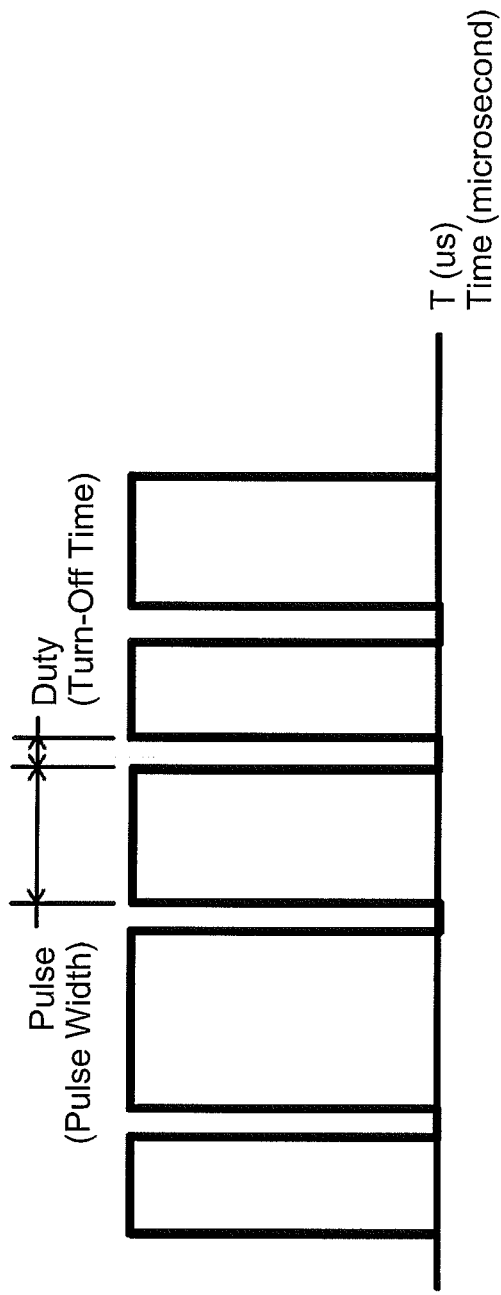
FIG. 6 is a pulse oscillogram of the ordinary transformer modulation.

Referring to FIG. 5, while the turn-on time "T" (microsecond us) is modulated constantly, the "VT curve" of the transformer can be ascertained and obtained by measuring the output voltage "V" of the secondary of the transformer. As shown in FIG. 6, in accordance with the "VT curve" of the transformer, modulating the time of a pulse width Pulse, which is the turn-on time of the transformer, can modulate the output voltage "V" of the transformer:

1. While Pulse<="Tb", such as "t0" in FIG. 5, the output voltage of the transformer will change from 0 to "$V_0$" (with respect to "t0") during the turn-on time.

2. While Pulse>"Tb", such as "t1" in FIG. 5, the output voltage of the transformer will change from 0 to a maximum voltage "Vmax" (with respect to "t1") and kept at the maximum voltage "Vmax" during the turn-on time.

According to the present invention, the energy output control circuit only needs to control a turn-off time Duty of the pulse, and does not need to concern the frequency of the pulse. The turn-off time Duty must be greater than a Demagnetized Time "Tc". Otherwise, the remanence of the transformer will influence the output of the transformer, or the transformer does not degauss for a long time to lead in the adverse permanent magnetization of the transformer. The factors influencing the Demagnetized Time "Tc" include structure and material of the transformer, a protection circuit and a demagnetized circuit. The Demagnetized Time "Tc" is ascertained upon the specific transformer and circuits. The output of the transformer is more stable owing to that the Demagnetized Time "Tc" is smaller than the turn-off time Duty of the PWM.

Figures 1, 7:
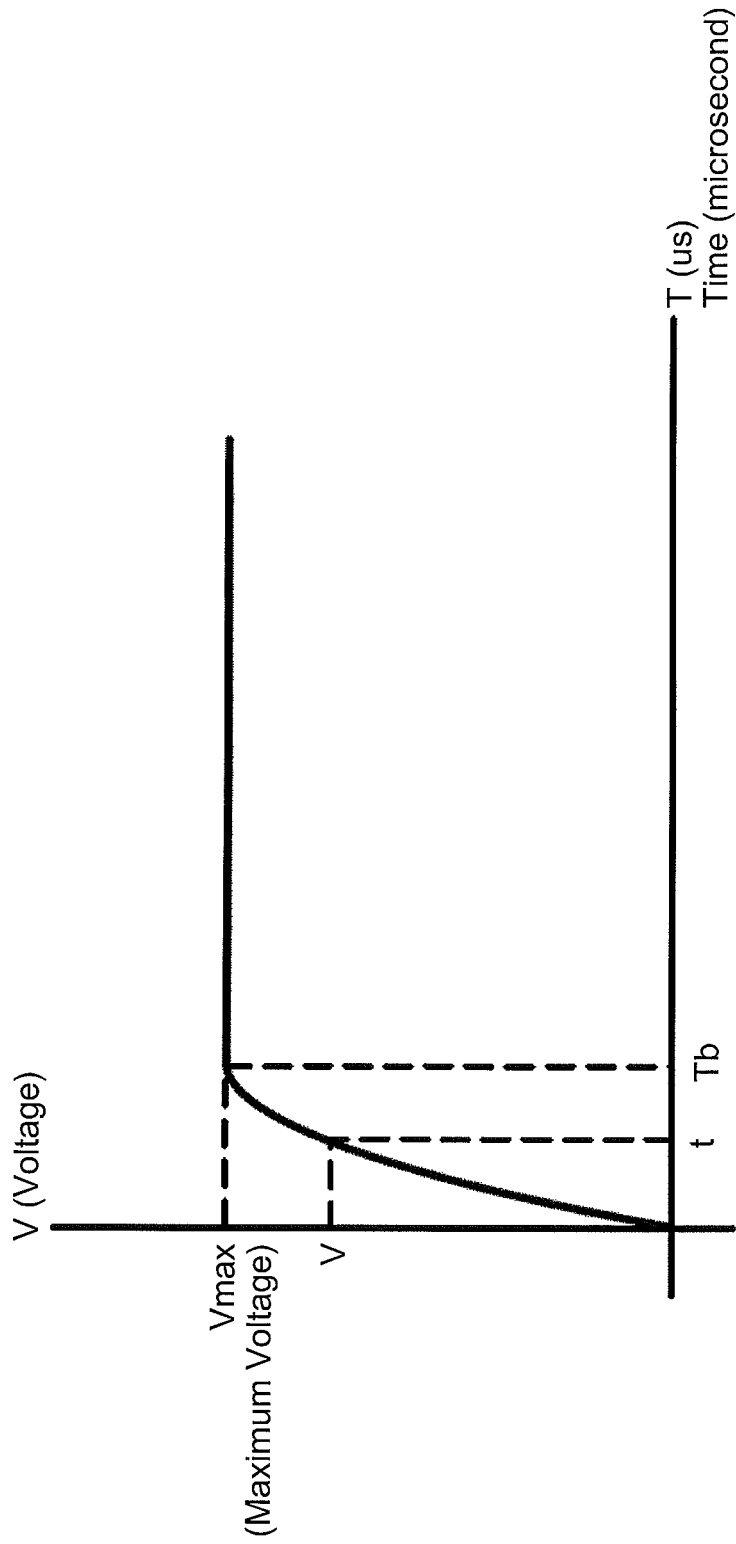
Figures 2, 7:
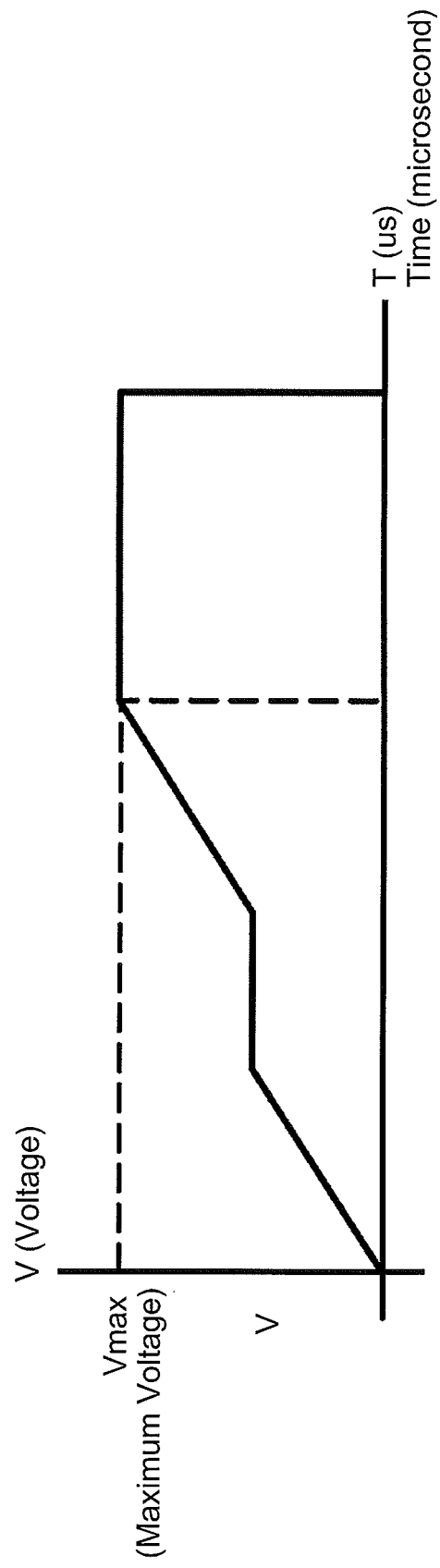
Figures 3, 4, 7:
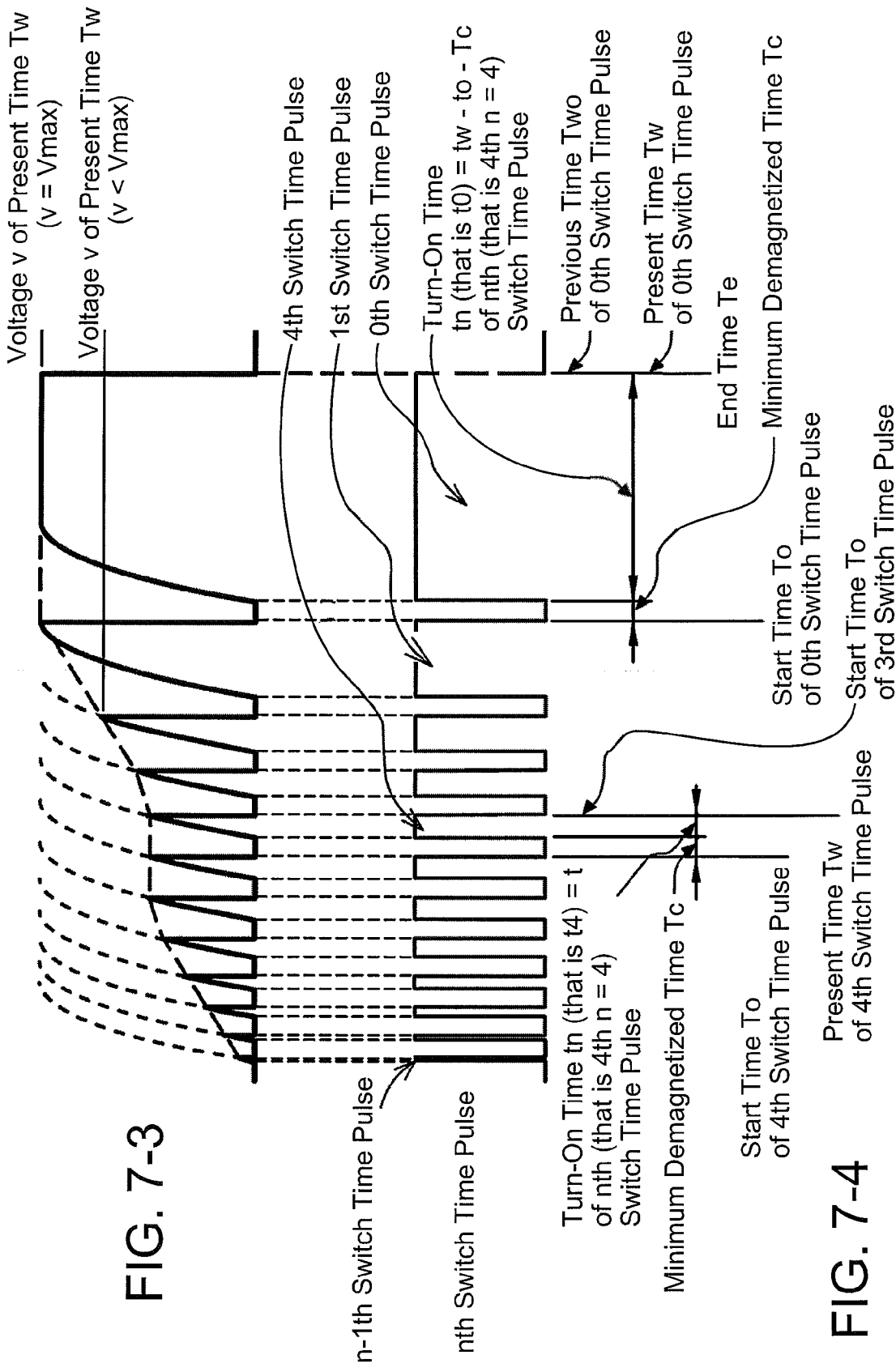
Figures 5, 7:
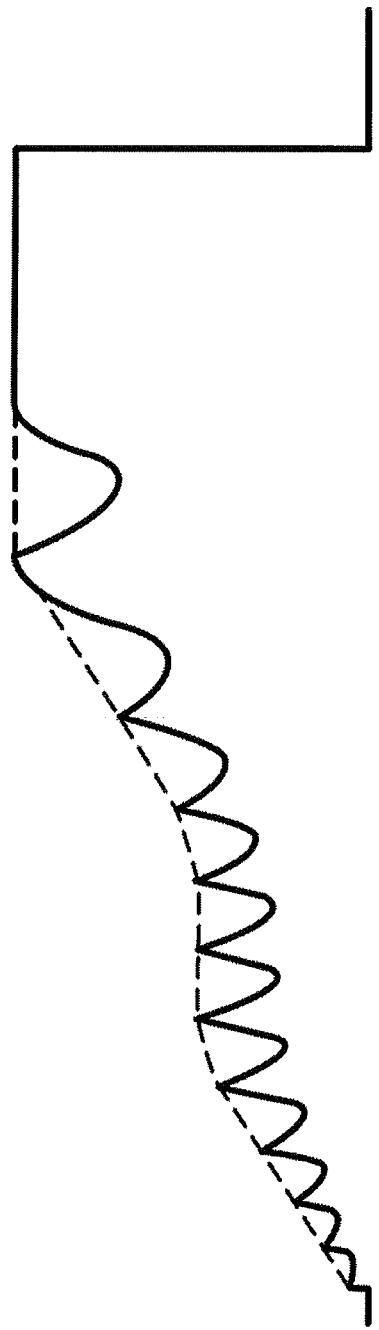

The control method of the energy output circuit in accordance with the present invention includes: first step, installing a controller used to control the switch device of the energy output circuit; second step, the controller measures the output characteristic curve generated by the ordinary low-frequency transformer and saves the output characteristic curve into a storage connected thereto, with the output characteristic curve shown in FIG. 7-1, the output voltage increases with time and keeps at a fixed value while the output voltage reaches the saturation value; third step, implementing the controller to calculate a required output energy waveform according to an output energy requested by the electric device or a pre-set output energy level decided by the operator, as shown in FIG. 7-2, with the graph consisting of a polyline, with the output energy increasing in the beginning and keeping at a fixed value while the output voltage reaches the saturation value, and with the output energy being 0 at the end; fourth step, implementing the controller to design an expected energy output waveform in accordance with the required output energy waveform, as shown in FIG. 7-3, with the expected output energy waveform having a serrated shape in the beginning and with the output energy increasing with time, the output energy keeps at a fixed value while the output energy reaches the saturation value, and with the output energy being 0 at the end; and fifth step, implementing the controller to send a command to the switch device to control the on/off time of the primary of the ordinary low-frequency transformer via the switch device. FIG. 7-4 shows a pulse waveform of the secondary of the transformer, with the pulse width of the pulse waveform of the secondary of the transformer increasing with time, with the output energy keeping at a fixed value while the output energy reaches the saturation value, and with the output energy being 0 at the end.

The controller calculates the pulse width, turn-off time and switch control timing according to the following method:

1. An End Time "te" is the finish time of a pulse and is a Present Time "tw" of the pulse, and is also a Start Time "to" of a pulse that is previous to the aforementioned pulse, and a time serial number "n" is 0;

2. According to a voltage "v" of the Present Time "tw", calculating a Turn-On Time "tn"; while the voltage "v"=maximum voltage "Vmax", the Start Time "to" of the pulse=the start time of the horizontal section of the curve, the Turn-On Time "tn"=the Present Time "tw"−the Start Time "to" of the pulse; while "v"<"Vmax", the Turn-On Time "tn"=a Minimum Turn-On Time "t", the Start Time "to" of the pulse=the Present Time "tw"−the Minimum Turn-On Time "t"−the minimum Demagnetized Time "Tc";

3. Time serial number "n" plus 1 while the Present Time "tw"=the Start Time "to" of the pulse that is previous to the aforementioned pulse; and 4. Repeat the calculation of steps 2 and 3 until the Present Time "tw"=0, that is the start time of the energy curve.

The storage has saved n Times, which are "t0", "t1"..."tn-1". Hence, it can implement a process of an energy output curve.

The controller sends a command in accordance with the steps listed below to the switch device to control the on/off state of the switch device.

1. Turn off the switch device; set up the time serial number "m"="n-1";

2. Turn on the switch device in which the turn-on time is "tm"; and then turn off the switch device in which the turn-off time is the minimum Demagnetized Time "Tc";

3. Set up the time serial number "m"=present time serial number "m -1", and repeat the above process, turn on the switch device in which the turn-on time is "tm"; and then turn off the switch device in which the turn-off time is the minimum Demagnetized Time "Tc"; and 4. Repeat the step 3 until "m"<0. According to the aforementioned method and steps, the output curve of the transformer can be modulated. Owing to the inherent inductance of the transformer, an actual output curve is better than that in FIG. 7-3, and, as shown in FIG. 7-5, the output curve is smoother.

The method in accordance with the present invention minimizes the Demagnetized Time "Tc", and it can guarantee the output curve forms a direct current power which is slightly wavy, and does not need a rectifier. The method provides a convenient, high-power and controllable direct current power.

Figure 8:
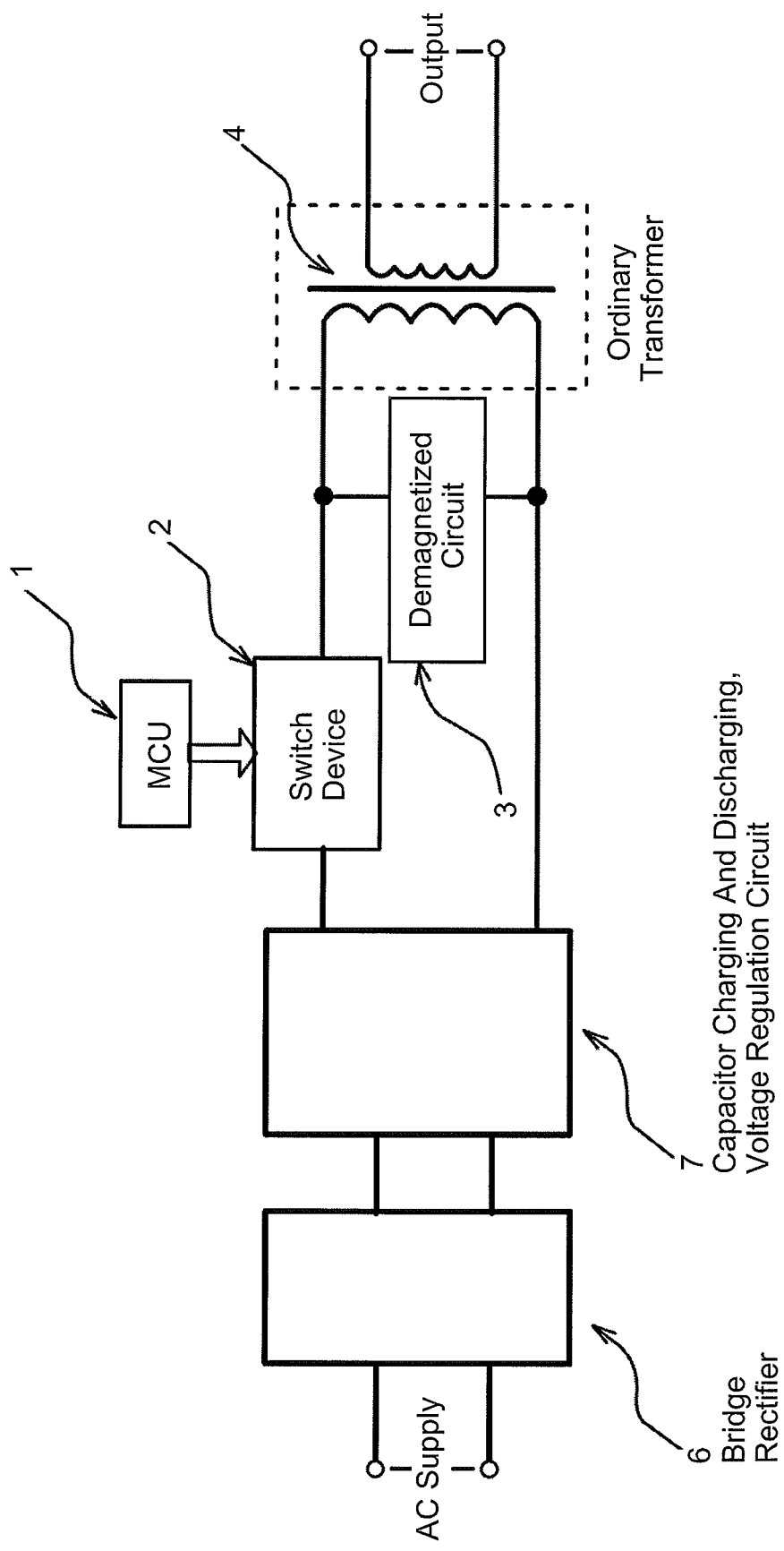
FIG. 8 is a circuit diagram illustrating an AC invert welding machine applied with the present invention.

Referring to a first embodiment, as shown in FIG. 8, the energy output control circuit is used to modulate an output circuit of an alternating power inverter welding machine. An alternating current supply is used to flow through a bridge rectifier 6 to form a direct current, and the direct current is charged into a large capacitance. After the voltage of the capacitance is modulated to a required value by a capacitor charging and discharging the voltage regulation circuit 7, the controller 1 modulates the waveform of the controlled pulse of the switch device 2 in accordance with the "VT curve" of the transformer and the required energy output waveform. A MCU is used to realize all kinds of energy output curves in a welding machine. Owing to the alternating current supply of the first embodiment, the switch device has to use a high voltage/current component, such as IGBT. Further, owing to the ordinary transformer, the welding machine can have great power. The greatest strength of the welding machine of the first embodiment is that the energy output waveform of the welding machine is adjustable.

With respect to the first embodiment, the alternating power inverter welding machine has 7kAV of power, and the transformer has 7kAV of power. There are 55 turns in the primary winding and 2 turns in the secondary winding. The primary is a 2.8 mm enameled wire, and the secondary is a 4.5 mm wire bound with 25 mm red copper. The switch device is IGBT manufactured by Fuji Electric Japan and the model is 2MBI200L-060, the controller is Atmega128-16$u$ manufactured by ATMEL America, and the demagnetized circuit is a reverse diode circuit. The output voltage of the voltage regulation circuit has a range from 0 to 280V DC.

Figure 9:
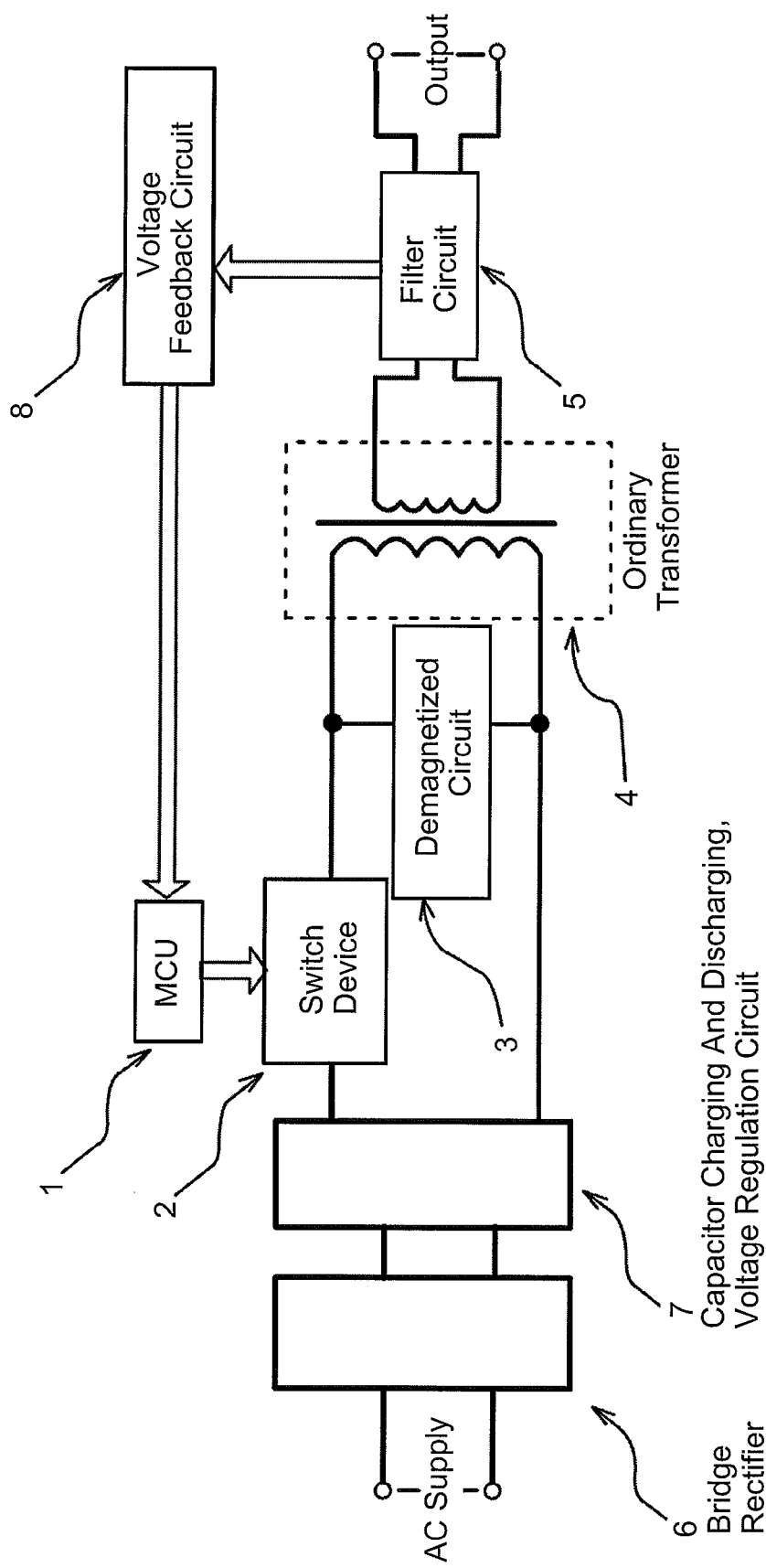
FIG. 9 is a circuit diagram illustrating a new type switch power applied with the present invention.

Referring to a second embodiment, as shown in FIG. 9, the energy output control circuit is used to modulate a switch power supply or a high-power direct current voltage control device. An alternating current supply is used to flow through a bridge rectifier 6 and be charged into a capacitance. After the voltage of the capacitance is modulated to a required value by a capacitor charging and discharging voltage regulation circuit 7, it forms a direct current supply having a adjustable output voltage "V". The secondary of a transformer does not need a rectifier connected therein, and the secondary of the transformer 4 connects with a filter circuit 5 to guarantee the output curve forms an output power supply with better quality. A voltage feedback circuit extracts a signal from the filter circuit 5 to the controller 1. The controller 1 modulates the waveform of the controlled pulse of the switch device 2 in accordance with the "VT curve" of the transformer, the required energy output curve and a signal of the voltage feedback circuit 8. It can form a wide range of direct current via the controller 1. The cost of the voltage feedback function of the circuit is very low since MCUs based on the present technology have a better AD module conversion function. feedback function of the circuit is very low due to that there are many MCU based on the present technology has better AD module conversion function.

The energy output is modulated by modulating the voltage V and the waveform of the controlled pulse of the switch device. This is generally impossible to achieve via an ordinary PWM switch power supply.

With respect to the second embodiment, the switch power supply or the high-power direct current voltage control device has 1000 Watts of power, and the transformer has 1kAV of power. There are 78 turns in the primary winding and 2 turns in the secondary winding. The primary is a 1.8 mm enameled wire, and the secondary is a 2.0 mm enameled wire. The switch device is IGBT manufactured by Fuji Electric Japan and the model is 2MBI600L-060, the controller is Atmega16-8$u$ manufactured by ATMEL America, and the demagnetized circuit is a reverse diode circuit, a RC filter circuit. Using the AD function of Atmega16-8$u$ to realize voltage feedback, the output voltage of the voltage regulation circuit has a range from 0 to 280V DC.

Figure 10:
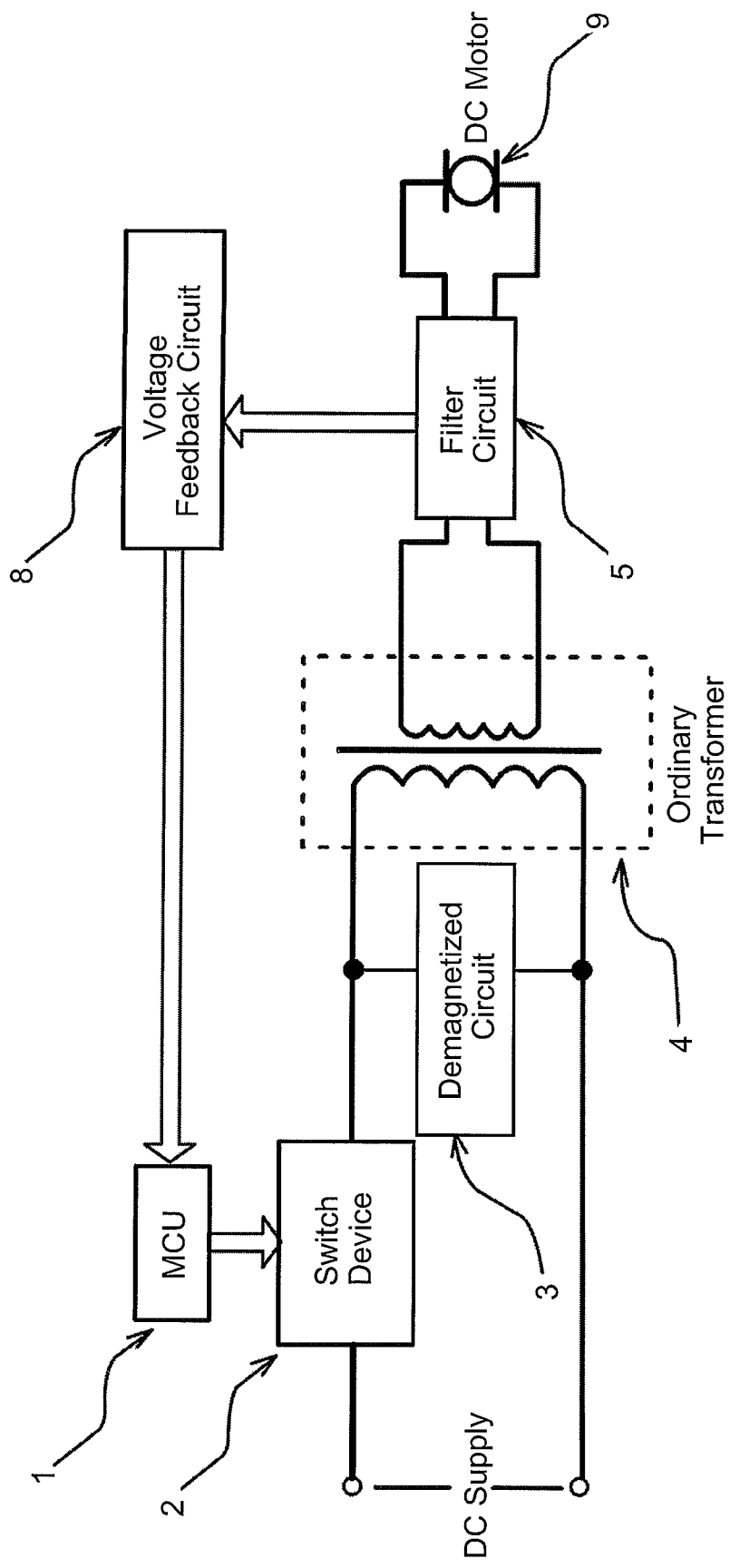
FIG. 10 is a circuit diagram illustrating a DC motor governor applied with the present invention.

Referring to a third embodiment, as shown in FIG. 10, the energy output control circuit is used to modulate a speed circuit of a direct current motor 9. The controller 1 modulates the waveform of the controlled pulse of the switch device 2 in accordance with the "VT curve" of the transformer, the required speed curve of the direct current motor 9 and a signal of the voltage feedback circuit 8. The secondary of the transformer connects with a filter circuit 5 to stabilize the rotation of the direct current motor 9.

The ordinary speed circuit of the direct current motor 9 does not require the voltage feedback too much, and some circuits even do not need the voltage feedback. Under the circumstances, the cost of the voltage feedback function of the circuit is very low since MCUs based on the present technology have a better AD module conversion function. If a higher quality voltage feedback circuit 8 is used, and the output pulse waveform of the transformer 4 is real-time adjusted via the switch device 2, and the speed curve of the direct current motor 9 can be modulated in higher precision.

It can easily realize a stepless speed regulation of the direct current motor 9 to real-time adjust the speed curve of the direct current motor 9 by using the energy output control circuit of the present invention.

With respect to the third embodiment, the direct current motor 9 is 12V/24V F280 motor manufactured by Shenzhen Puda Motor co., Ltd, a 15V/220V 20W transformer, the switch device is IRG4PC60F manufactured by International Rectifier, and the demagnetized circuit is a reverse diode circuit, a RC filter circuit. The AD function of Atmega 16-8$u$ is used to realize voltage feedback.

What is claimed is:

1. An energy output control method comprising:

installing a controller controlling a switch device of an energy output circuit;

implementing the controller to calculate a required output energy waveform according to an output energy requested by an electric device or a pre-set output energy level decided by an operator;

implementing the controller to design an expected energy output waveform for the controller in accordance with the required output energy waveform; and implementing the controller to send a command in accordance with the expected energy output waveform to control the switch device, to control an on/off time of a primary of an ordinary low-frequency transformer via the switch device;

implementing the controller to receive a feedback signal generated from an output of the ordinary low-frequency transformer and modulate the expected energy output waveform, wherein the controller calculates a pulse width, a turn-off time and a switch control timing according to the following method:

a.) defining an End Time (te) which is a finish time of a first pulse and is a Present Time (tw) of the first pulse, and is also a Start Time (to) of a second pulse that is previous to the first pulse, and a time serial number (n) is 0;

b.) calculating a Turn-On Time(tn) according to a voltage (v) of the Present Time (tw); wherein when the voltage (v) equals a maximum voltage (Vmax), a Start Time (to) of the first pulse equals a start time of a horizontal section of the expected energy output waveform, the Turn-On Time (tn) equals the Present Time (tw) minus the Start Time (to) of the first pulse and wherein when the voltage (v) is less than the maximum voltage (Vmax), the Turn-On Time (tn) equals a Minimum Turn-On-Time (t), the-Start Time (to) of the first pulse equals the Present Time (tw) minus the Minimum Turn-On Time (t) minus a minimum Demagnetized Time (Tc);

c.) incrementing the time serial number (n) by 1 while the Present Time (tw) equals the Start Time (to) of the second pulse that is previous to first pulse; and d.) repeating the steps b.) and c.) until the Present Time (tw) equals 0, that is a start time of the expected energy output waveform.

2. The energy output control method as claimed in claim 1, wherein the controller measures an output characteristic curve generated by the ordinary low-frequency transformer and saves the output characteristic curve into a storage connected thereto.

3. The energy output control method as claimed in claim 1, wherein a pulse width of an on/off time pulse of the ordinary low-frequency transformer increases, decreases or remains unchanged with time.

4. The energy output control method as claimed in claim 3, wherein a turn-off time of a secondary of the ordinary low-frequency transformer is larger than the minimum Demagnetized time (Tc) of the ordinary low-frequency transformer.

5. An energy output control circuit comprising:

a transformer, wherein the transformer is an ordinary low-frequency transformer, wherein a switch device is connected between a primary of the transformer and an input power in series, wherein the switch device receives a control signal of a controller, wherein a demagnetized circuit connects with both sides of the primary of the transformer in parallel.

6. The energy output control circuit as claimed in claim 5, wherein a secondary of the transformer connects with a filter circuit.

7. The energy output control circuit as claimed in claim 6, wherein a voltage feedback circuit is connected between the filter circuit and the controller.

* * * * *